United States Patent [19]
Chandra et al.

[11] Patent Number: 6,044,249
[45] Date of Patent: Mar. 28, 2000

[54] METHOD FOR DETERMINING HANDOVER MARGINS IN A CELLULAR COMMUNICATION SYSTEM

[75] Inventors: Claudia Chandra, Arlington Heights; Wu-Hon Francis Leung, Downers Grove; Timothy M. Jeanes, Palatine, all of Ill.

[73] Assignee: Motorola, Inc., Schaumburg, Ill.

[21] Appl. No.: 08/745,523

[22] Filed: Nov. 12, 1996

[51] Int. Cl.[7] .................................................. H04Q 7/34
[52] U.S. Cl. ............................................ 455/62; 455/513
[58] Field of Search ..................................... 455/456, 513, 455/430, 442, 437, 62, 444, 439; 375/200; 370/335, 331, 347

[56] References Cited

U.S. PATENT DOCUMENTS

| 5,095,500 | 3/1992 | Tayloe et al. . | |
| 5,175,867 | 12/1992 | Wejke et al. | 455/33.1 |
| 5,212,831 | 5/1993 | Chuang et al. | 455/54.1 |
| 5,381,443 | 1/1995 | Borth et al. | 375/1 |
| 5,457,810 | 10/1995 | Ivanov et al. | 455/33.2 |
| 5,479,410 | 12/1995 | Paavonen | 370/95.3 |
| 5,491,837 | 2/1996 | Haartsen | 455/62 |
| 5,499,386 | 3/1996 | Karlsson | 455/33.2 |
| 5,504,803 | 4/1996 | Yamada et al. | 379/59 |
| 5,517,674 | 5/1996 | Rune | 455/33.2 |
| 5,542,098 | 7/1996 | Bonta | 455/33.2 |
| 5,544,224 | 8/1996 | Jonsson et al. | 379/58 |
| 5,548,818 | 8/1996 | Sawyer et al. | 455/54.1 |
| 5,551,058 | 8/1996 | Hutcheson et al. | 455/33.2 |
| 5,551,059 | 8/1996 | Hutcheson et al. | 455/33.2 |
| 5,561,845 | 10/1996 | Bendixen et al. | 455/33.4 |
| 5,566,358 | 10/1996 | Obayashi et al. | 455/54.1 |
| 5,577,022 | 11/1996 | Padovani et al. | 370/13 |
| 5,613,208 | 3/1997 | Blackman et al. | 455/34.1 |
| 5,640,414 | 6/1997 | Blakeney, II et al. | 375/200 |
| 5,640,677 | 6/1997 | Karlsson | 455/33.2 |
| 5,666,656 | 9/1997 | Rautiola | 455/513 |

OTHER PUBLICATIONS

Dassanayake, "Effects of Measurement Sample Averaging on Performance of GSM Hanover Algorithm", IEEE Electronics Letters, Jun. 1993.

David, Blance, Kassing, "Handover and Link Adaptation Evaluation of the RACE/ATDMA System Concept for a 3rd Generation Air Interface by Simulation", IEEE, May 1996.

Mason, "Xypoint To Participate In Traffic Trial", Wireless Week, Jul. 1997.

*Primary Examiner*—William Cumming
*Attorney, Agent, or Firm*—Kenneth A. Haas

[57] ABSTRACT

Optimal handover margins in a cellular communication system (100) are determined by computing a power budget (701) for each base station/neighbor combination in the communication system (100) and determining a probability distribution function (703) for each base station/neighbor combination in the communication system (100). Once the probability distribution function for each base station/neighbor combination is known, optimal handover margins are determined by maximizing communication system traffic over all base stations while at the same time holding call quality to acceptable levels.

17 Claims, 4 Drawing Sheets

METHOD FOR DETERMINING HANDOVER MARGINS IN A CELLULAR COMMUNICATION SYSTEM

FIELD OF THE INVENTION

The present invention relates generally to cellular communication systems and, in particular, to determining optimal handover margins in a cellular communication system.

BACKGROUND OF THE INVENTION

Communication systems are known to comprise a plurality of base stations that provide communication services to communication units located in corresponding service coverage areas of the base stations. One known communication system is the Global System for Mobile Communications (GSM) system. In the GSM system, a remote unit (e.g., a remote or portable radiotelephone) that desires to communicate, sends a channel request signal to a base station serving the coverage area in which the remote unit resides. Upon receiving the channel request signal, the serving base station allocates a communication channel for the communication and the remote unit begins communicating with a telephone network subscriber or another remote unit via the serving base station.

As the remote unit moves to the periphery of the serving base station's coverage area, and into the coverage area of neighboring base stations, a handover to a chosen base station is usually attempted to maintain call continuity. Under normal conditions, remote units are served by base stations that provide the strongest signal, and handovers are initiated when the server's received signal quality has fallen below a pre-defined threshold, or a neighbor's received signal becomes stronger than the server's received signal, after some appropriate averaging window and hysterisis margin. In the case that more than one neighbor base station is stronger than the serving base station, handover is ideally attempted to the strongest neighbor. Quantitatively, handoff is commonly attempted when $PBGT(c,n) \cong PL(c) - PL(n) \geq H(c,n)$, where $PL(c)$ is the path loss from the serving base station to the remote unit, $PL(n)$ is the path loss from the neighbor base station to the remote unit, and $H(c,n)$ is the handover margin between base station c and neighbor n, which in the ideal case is set to zero. (In practice the handover margin is set to a small, positive number by default to guard against ping-pong between mutual neighbor base stations).

In a live network, the traffic loads experienced by neighboring base stations tend to vary at different times of the day and commonly follows predictable patterns according to rush hours and centers of activities. Therefore, simply handing over to the neighbor base station with the best signal quality (i.e., having greatest power budget $PBGT(c,n)$ above the corresponding handover margin) often times will not achieve the most system capacity since an opportunity to load share among less loaded neighbors may exist. Thus a need exists for a method and apparatus for determining optimal handover margins in a cellular communication system to achieve better load carrying capacity while maintaining acceptable signal quality.

DETAILED DESCRIPTION OF THE DRAWINGS

Figure 1:
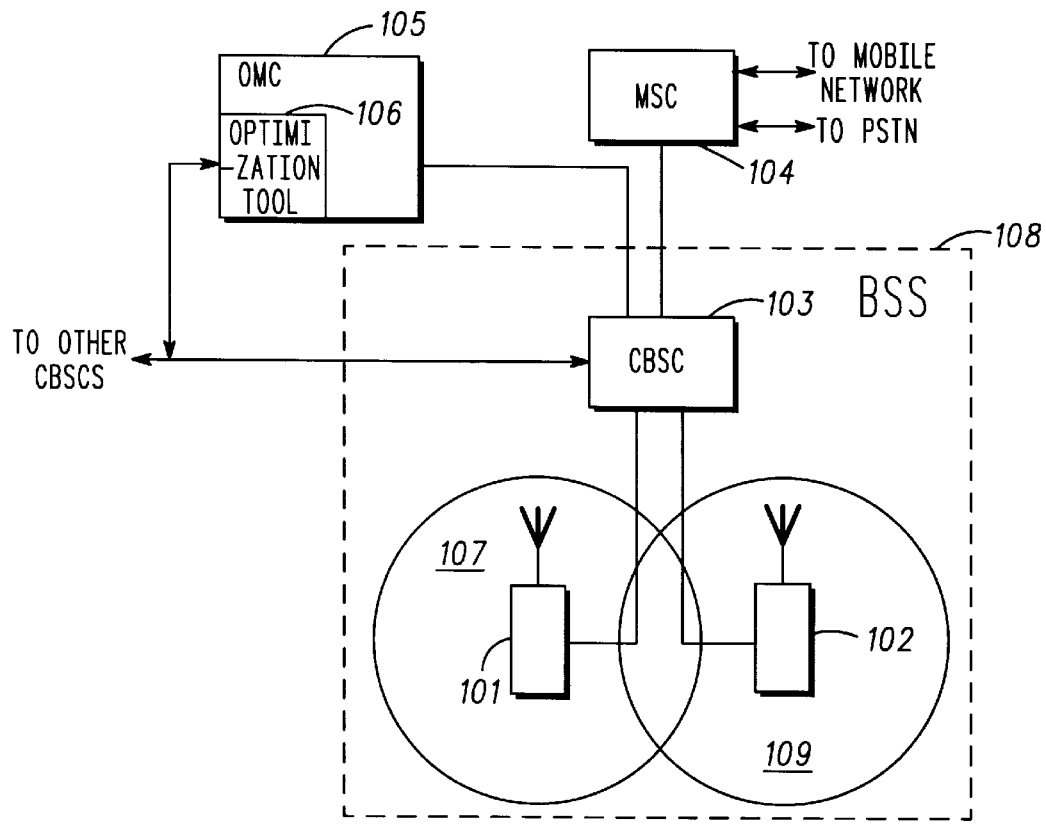
FIG. 1 illustrates a cellular communication system in accordance with the preferred embodiment of the present invention.

Stated generally, optimal handover margins in a cellular communication system are determined by computing power budgets for each base station/neighbor combination in the communication system and determining a probability distribution function for each base station/neighbor combination in the communication system. Once the probability distribution function for each base station/neighbor combination is known, optimal handover margins are determined that maximize communication system traffic over all base stations while at the same time holding call quality to acceptable levels.

The present invention encompasses a method for determining a handover margin in a communication system. The method comprises the steps of measuring a signal quality of a serving base station and a neighbor base station to produce a comparison in signal quality between the serving and the neighbor base station and determining a percentage of traffic absorbed by the neighbor base station for a given handover margin based on the comparison in signal quality between the serving and the neighbor base station. The handover margin between the serving base station and the neighbor base station is then adjusted based on the determination.

An alternate embodiment of the present invention encompasses a method for determining a handover margin in a cellular communication system. The method comprises the steps of measuring by a remote unit, a downlink power level of a serving base station, measuring by the remote unit a downlink power level of a neighbor base station, and determining a percentage of traffic absorbed by the neighbor base station for a given handover margin based on the downlink power measurements. The handover margin between the serving base station and the neighbor base station is then adjusted to maximize a communication system capacity, based on the determination.

Yet another embodiment of the present invention encompasses a method for adjusting a handover margin ($H(c,n)$) between a serving base station (c) and a neighbor base station (n). The method comprises the steps of determining a power budget ($PBGT(c,n)$) of the serving base station, where $PBGT(c,n) \cong PL(c) - PL(n)$, $PL(c)$ is the pathloss from the remote unit to the serving base station (c), and $PL(n)$ is a pathloss from a remote unit to the neighbor base station (n). A distribution function (F) of PBGT(c,n) is then calculated, wherein a percentage of remote units that will be absorbed from the serving base station to the neighbor base station is 1-F(H(c,n)). Finally, a determination is made, based on the distribution function, if the remote unit will handover to the neighbor base station when the handover margin is set to a certain value, wherein the remote unit will handover to the neighbor base station when PBGT(c,n) is approximately equal to H(c,n).

Yet another embodiment of the present invention encompasses a method comprising the steps of measuring downlink power levels of a serving base station and a neighbor base station to produce a power budget measurement and determining a percentage of traffic absorbed by the neighbor base station for a given handover margin based on the power budget measurement.

Finally, another embodiment of the present invention encompasses an apparatus for adjusting a handover margin (H(c,n)) in a cellular communication system comprising an optimization tool having as an input PL(c) and PL(n) and having as an output, an optimized handover margin, wherein PL(n) is a pathloss from a remote unit to a neighbor base station n, and PL(c) is the pathloss from the remote unit to the serving base station c. The apparatus additionally comprises a configuration database having as an input the optimized handover margin.

FIG. 1 illustrates communication system 100 in accordance with the preferred embodiment of the present invention. In the preferred embodiment of the present invention, communication system 100 utilizes the Global System for Mobile Communications (GSM) protocol, but in alternate embodiments communication system 100 may utilize other analog or digital cellular communication system protocols such as, but not limited to, the Code Division Multiple Access (CDMA) system protocol, the Narrowband Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol. Communication system 100 comprises Base Station Subsystem (BSS) 108 comprising base stations 101 and 102 having respective coverage areas 107 and 109, and Centralized Base Station Controller (CBSC) 103. Communication system 100 additionally comprises Operations Maintenance Center (OMC) 105 comprising optimization tool 106, and Mobile Switching Center (MSC) 104. In the preferred embodiment of the present invention, base stations 101 and 102 are suitably coupled to CBSC 103, and CBSC 103 is suitably coupled to MSC 104.

Operation of communication system 100 in accordance with the preferred embodiment of the present invention occurs as follows: As described in GSM 5.08, when sending a measurement report, a remote unit reports back to serving base station 101 signal quality information (downlink power level) of serving base station 101 and the strongest surrounding base stations. In the preferred embodiment of the present invention base station 101 reports the remote unit's downlink power level to CBSC 103, which in turn communicates this information to OMC 105. In addition to reporting the remote unit's downlink power level, base station 101 reports to CBSC 103 and OMC 105 base station loading characteristics. OMC 105 then calculates optimal handover margins for all base station/neighbor combinations within communication system 100. (Details of calculating an optimal handover margin are discussed below). In the preferred embodiment of the present invention a compromise is made between call quality and evenly distributing traffic channel density among base stations within communication system 100 such that the remote unit's call quality may be sacrificed at the expense of more evenly loading communication system 100. In other words, less heavily loaded base stations are allowed to serve remote units beyond their ideal boundaries so that traffic load can be more evenly distributed among base stations.

Continuing, once optimal handover margins are computed for all base station/neighbor combinations within communication system 100, OMC 105 stores this information along with a time period during which similar traffic distribution patterns persist. (The storing of handover margin/time period information may comprise the steps of updating a current database if handover margin/time period information has already been stored). In the preferred embodiment of the present invention, OMC 105 accesses an internal database where optimal handover margins are stored as a function of time period and retrieves optimal handover margins for the current time period, but in an alternate embodiment OMC 105 continuously calculates optimal handover margins in a real-time fashion.

Continuing, once OMC 105 determines the optimal handover margins, OMC 105 reports the optimal handover margins to all BSSs within communication system 100 By allowing remote units to be served by base stations with lower received signals (but still within an acceptable quality level), localized congestion can be avoided and a higher call carrying capacity can be achieved by communication system 100.

Calculating an Optimal Handover Margin

As described in GSM 5.08, measurements of downlink power level of serving and surrounding base stations are reported by the remote unit to its serving base station with every measurement report. In the preferred embodiment of the present invention, at every measurement period, the following value is calculated at the base station based on the measurement report and the known configuration of the base stations transmitted power levels:

$$PBGT(c,n) \approx PL(c)-PL(n),$$

where
  PBGT(c,n)=the power budget of a neighbor base station n with respect to serving base station c.
  PL(n)=pathloss from the remote unit to neighbor base station n to base station c (in dB).
  PL(c)=pathloss from the remote unit to serving base station c (in dB).

In the preferred embodiment of the present invention, when PBGT(c,n)≧H(c,n) (where H(c,n) is the handover margin from serving base station c to neighbor base station n), a handover caused by power budget is triggered. Additionally, when more than one neighbor base station satisfies the above condition, then the neighbor with the highest power budget value is selected as the target base station for a handover.

In the preferred embodiment of the present invention, setting H(c,n) for various base stations, requires that a percentage of traffic absorbed by a neighbor base station (n) for a given value of H(c,n) needs to be known. In the preferred embodiment of the present invention an approximation is made for the amount of traffic that will be absorbed by a neighbor base station by looking at past measurements of remote units in the boundary region of the serving base station having various values of power budgets for various neighbors. Determining the percentage of remote units having particular power budget measurements indicates how many remote units will be handed over to a particular neighbor base station when H(c,n) is set to a certain value. Although in the preferred embodiment of the present invention, PBGT(c,n) is utilized to determine the percentage of traffic absorbed by a neighbor base station, in alternate embodiments of the present invention, any comparison in signal quality parameters can be utilized to determine the percentage of traffic absorbed by a neighbor base station.

As discussed above, in the preferred embodiment of the present invention, a trade off is made between call quality and more evenly loading communication system 100. Although there may be a sacrifice between call quality and even base station loading, in the preferred embodiment of the present invention, received signal strength is not allowed to degrade beyond a threshold level. In particular, in the preferred embodiment of the present invention when choosing an appropriate handover margin between a base station (c) and a neighbor (n), the following criteria for call quality are met:

1. The measurement of Rx_Lev(n) (received signal strength) for neighbor n is above Rx_Lev_Threshold where Rx_Lev_Threshold is a measure of "good enough" signal level. This condition indicates whether the neighbor can adequately serve the remote unit.

2. PBGT(c,n) is among the highest measured for the remote unit. This condition attempts to ensure that tradeoffs between load distribution and call quality are made only among the top neighbors with the best received signal strengths, and that remote units are handed over to base stations that are closer to their location.

Figure 2:
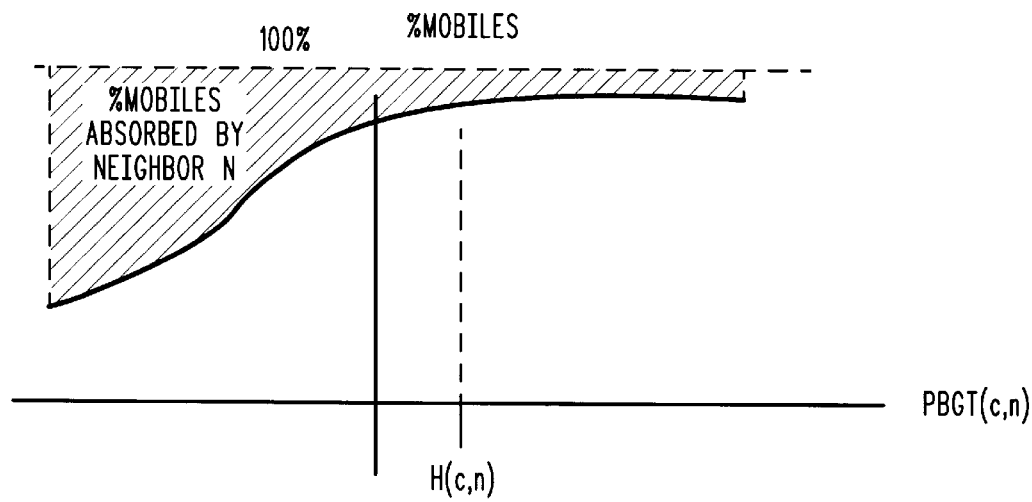
FIG. 2 illustrates a probability distribution function of a power budget measurement obtained from measurement reports and known configuration of base stations' transmitted powers.

Determining the power budget measurements of remote units and counting the measurements of the strongest reported neighbors from various remote units, (where the received signal strength is less than Rx_Lev_Threshold or the power budget is less than a certain value) yields a distribution function of the power budget measurements for each neighbor base station (n) with the percentage of remote units having each power budget value or those not meeting the first of the above conditions. An example of this distribution is shown in FIG. 2. As shown in FIG. 2, on a per neighbor base station basis, the percentage of remote units that will be absorbed from the traffic currently covered by the serving base station, when H(c,n) is set to a certain value is 1-F(H(c,n)), where F is the distribution function of PBGT(c,n). Although in the preferred embodiment of the present invention F(PBGT(c,n)) is determined empirically, in an alternate embodiment of the present invention F(PBGT (c,n)) is approximated by a normal distribution where the mean, and standard deviation parameters are calculated from the measurement report data. Optimizing H(c,n) occurs by formulating the handover margin optimization parameter problem as a nonlinear optimization problem. An example of this is described below.

Let the following variables define the parameters in communication system 100:

T(c)=Traffic currently originated within base station c's coverage, including served and blocked calls (Erlangs).

S(c)=Amount of traffic (Erlangs) from T(c) that will be retained by base station c with the optimized settings of various handover margin neighbor parameters.

G(c,n)=Amount of traffic (Erlangs) out of T(c) that base station c gives up to neighbor base station n when the handover margin is set to H(c,n).

H(c,n)=Handover margin setting from base station c to neighbor base station n.

R(c)=Resource (offered load, i.e., number of carriers) of base station c (Erlangs).

Figure 3:
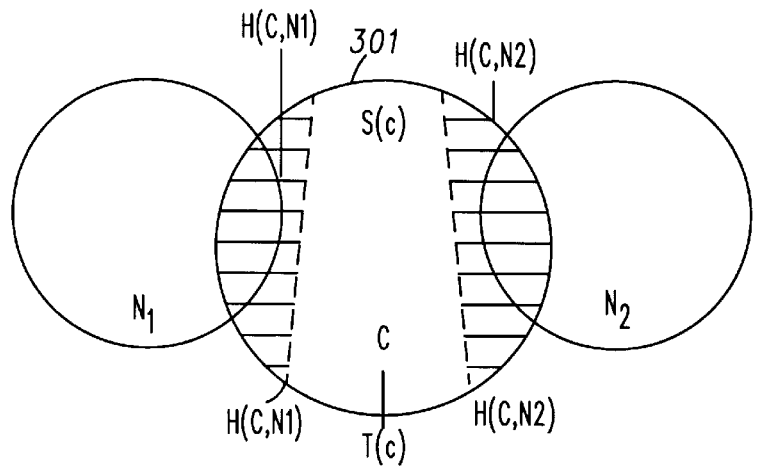
FIG. 3 illustrates communication system parameters that are utilized in determining an optimal handover margin in accordance with a preferred embodiment of the present invention.

The above variables are illustrated in FIG. 3. Referring to FIG. 3, base station c is shown to have two neighbor base stations n1 and n2. The traffic that is currently generated within base station c is bounded by heavy circle 301. The handover margins to the two neighbor base stations are set to H(c,n1) and H(c,n2) respectively, and with these settings, the distribution of traffic that base station c is giving up to base stations n1 and n2 are denoted by the areas inside the horizontal hatched lines (G(c,n1), G(c,n2)). The traffic that base station c retains is the area that is left from the heavy circle after subtracting the horizontal hatched areas, and is denoted by S(c). (Note that since T(c) includes the blocked calls that are originated in base station c, whereas S(c), G(c,n1), and G(c,n2) denote the amount of traffic that can actually be served by the base stations according to each base station's offered load, $$T(c) \geq S(c) + \sum_{\text{over all neighbors } (n)} G(n).$$

In the preferred embodiment of the present invention an optimized handover margin is formulated by maximizing traffic over all base stations within communication system 100, and at the same time, minimizing the handover margins throughout communication system 100. (The minimization of handover margins throughout communication system 100 serves to prefer neighbors with higher overlap). In the preferred embodiment of the present invention, such an optimization is accomplished by using two objective functions, the first of which maximizes $$S(c) + \sum_{\text{over all neighbors } (n)} G(n)$$

over the entire communication system, and the second of which minimizes the handover margin (H(c,n)) over the entire communication system. Such an optimization is accomplished by solving the following equations:

$$\text{MAX}\left\{\sum_{\text{overallcells}(c)} \left[S(c) + \sum_{\text{over all neighbors }(n)\text{ for cell }(c)} G(c,n)\right]\right\} \quad \text{Eq. (1)}$$

and $$\text{MIN}\left\{\sum_{\text{over all cells }(c)} \sum_{\text{over all neighbors }(n)\text{ of cell}(c)} H(c,n)^2\right\}. \quad \text{Eq. (2)}$$

Due to the fact that two base stations may share part of the same geographic area, equations (1) and (2) are subject to the following nonlinear constraints that characterizes the constraints on overlapping regions between neighbor base stations, each cell's resource, the traffic generated within each base station, ping-pong margin between mutual neighbors, and minimum/maximum allowable handover margins for acceptable call quality:

Eq. (3) For each base station/neighbor combination $(c, n)$ $$G(c, n) \leq \left\{ 1 - F(h(c, n1)) - \left[ \sum_{\substack{n2 \in \text{neighbors} \\ \text{of } c, \text{ where } n2 \neq n1}} P(x \geq H(c, n1), x - y < H(c, n1) - H(c, n2)) + \sum_{\substack{n2, n3 \in \text{neighbors of } c, \\ n2, n3 \neq n1}} P(x \geq H(c, n1), x - y < H(c, n1) - H(c, n2), x - z < H(c, n1) - H(c, n3)) \right] * T(c) \right\}$$

where $x \in PBGT(n1)$, $y \in PBGT(n2)$, in the first summation and $X \in PBGT(n1)$, $y \in PBGT(n2)$, and $z \in PBGT(n3)$ in the second summation.

Eq. (4) for each base station $c$, $S(c) \leq T(c) - \sum_{\text{over all neighbors}(n)} G(c, n)$.

Eq. (5) for each base station $c$, $\sum_{\text{over all neighbors }(n)} G(c, n) + S(c) \leq R(c)$.

Eq. (6) for each base station/neighbor $(c, n)$, $H*(c, n) + P < H(n, c)$, where $P > 0$.

Eq. (7) $Ho\_min \leq Ho\_max$ for each base station $c$ and neighbor $n$, where $Ho\_min$ and $Ho\_max$ are the minimum and maximum allowable handover margins to ensure acceptable call quality.

Additionally, T(c), S(c), G(c,n), and R(c)≧0, whereas Ho_min and Ho_max are not restricted in sign.

As mentioned above, in the above formulation, the first objective function tries to maximize the overall traffic carried by all the base stations in the network, while the second objective function makes a trade off between maximizing capacity with maintaining good signal quality. In ideal situations, Eq. 2 generates a handover margin at the point when the signal strength of the neighbor and serving base station c is equal (handover margin equals 0). With this objective function, when there are more than one lightly loaded neighbors the overflow traffic will be partitioned to the neighbors such that the path losses are minimized.

Referring to Eq. 3, F() denotes the distribution function of the power budget measurements and P() denotes the corresponding joint probability functions. Eq. 3, states that the amount of traffic that base station c gives up to a neighbor base station n is bounded by the percentage of remote units having power budget measurements above the handover margin setting H(c,n). The additional terms in the multiplier are needed to reflect the overlapping regions of the traffic distribution among the neighbor base stations. The first summation represents the overlap between any pair of neighbors that may result in traffic attributed to neighbor n1 being actually absorbed by neighbor n2. As indicated above, a remote unit will actually be absorbed by neighbor n2 when its power budget measurement for neighbor n1 is greater than H(c,n1), but the difference between the power budget measurements for neighbors n1 and n2 is less than H(c,n1)–H(c,n2). In such a case PBGT(c,n1)–H(c,n1)<PBGT(c,n2)–H(c,n2). The joint density function in the first summation term reflects the amount of traffic overlap that is absorbed by base station n2 out of the traffic that has already been attributed to base station n1 in the first distribution function term. The second summation term represents the amount of overlap between any three neighbor base stations. The first summation term would have reduced any three-way distribution overlap twice, therefore this amount has to be added back into the percentage calculation. Up to three-way overlap among coverage areas are considered, which in most cases, is a good enough approximation.

Figure 4:
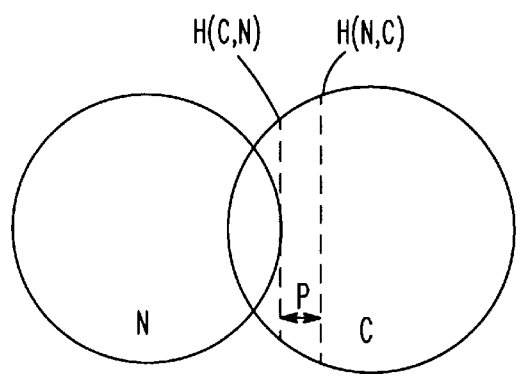
FIG. 4 illustrates the relative placements of the handover margin boundaries between neighboring base stations that are necessary to avoid ping-pong.

Eq. 4, represents a constraint relationship among the traffic that each base station retains, the amount that it gives up to its neighbors, and the total traffic generated within its boundaries. Eq. 5, reflects the resource constraint of each base station. This constraint states that the amount of traffic that each base station absorbs from its neighbors and the amount of traffic that it retains (not including blocked calls) are bounded by its resources (offered capacity). Eq. 6, is a constraint on the settings of the handover margins of neighboring base stations to prevent ping-pong handovers. FIG. 4 illustrates the relative placements of the handover margin boundaries between neighboring base stations that are necessary to avoid ping-pong. Referring to FIG. 4, the parameter P denotes the distance between the two handover margin boundaries.

Since the handover margins optimization problem is formulated as a constrained nonlinear optimization, in the preferred embodiment of the present invention, optimization tool 106 is used to solve the objective function with its associated constraints to obtain optimal values for the handover margin parameters H(c,n). The optimization analysis is based on groups of measurement data having similar traffic distribution functions pattern. Each distribution pattern may then yield different sets of optimal handover margin settings. In an alternate embodiment of the present invention, cluster analysis techniques (techniques where clusters of similar patterns are identified, thus identifying periods of time, and base station clusters where similar traffic concentration patterns exist) are used to analyze similar distribution patterns.

In addition to determining optimal handover margins, results from the above analysis could also be used to determine base stations that need additional resources because of very high traffic concentration. This can be accomplished by analyzing Eq. 4, to derive the following equation:

$$T(c) = S(c) + \sum_{\text{over all neighbors}(n)} G(c,n) + \sigma(T(c)) \qquad \text{Eq. (8)}$$

where $\sigma(T(c))$ is the slack in Eq. 4 that indicates how much more resources are required to handle the additional traffic in base station c.

Similarly, from Eq. 5, the following can be derived:

$$R(c) = \sum_{\text{over all neighbors}(n)} G(c,n) + S(c) + \sigma(R(c)) \qquad \text{Eq. (9)}$$

where $\sigma(R(c))$ is the slack between the amount of resources available in a base station and how much traffic it's serving. The slack value indicates if additional resources are available in the base station to possibly increase its physical coverage. Both of the above slack information would help in the planning and deployment of additional resources for various base stations in the network.

In the preferred embodiment of the present invention, the optimization model allows the determination of the maximum capacity that can be achieved by moving handover margins; the setting of the handover margins to achieve that maximum capacity; and pinpoints areas where redistribution of traffic to overlapping base stations can no longer be achieved to handle the generated traffic load and therefore, additional resources may be required (such as adding carriers or splitting base stations).

Figure 5:
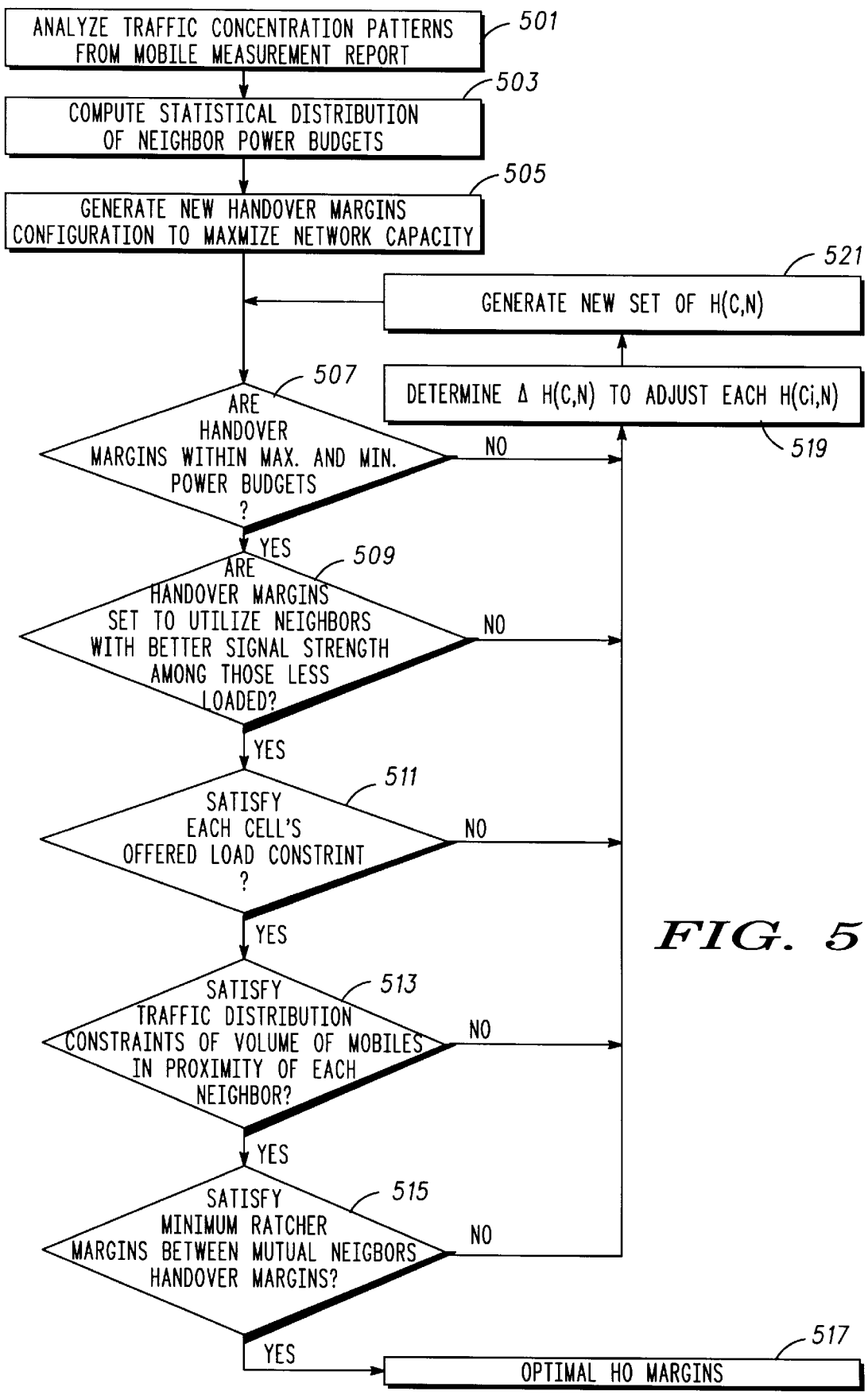
FIG. 5 is a flow chart illustrating the steps necessary to obtain handover margins in accordance with the preferred embodiment of the present invention.

FIG. 5 is a flow chart illustrating the steps necessary to obtain handover margins in accordance with the preferred embodiment of the present invention. The logic flow starts at step 501 where optimization tool 106 analyzes traffic concentration patterns and computes power budgets (PBGT $(c,n) \cong PL(c) - PL(n)$) from measurement reports transmitted by remote units within communication system 100. Next, at step 503 the statistical distribution F(PBGT(c,n)) of neighbor power budgets is determined. Next, at step 505 new handover margins are generated for communication system 100 and the logic flow continues to step 507. At step 507 it is determined if the new handover margins are within the maximum and minimum power budgets allowable (see Eq. 7), and if not the logic flow continues to step 519, where deltas for adjusting each handover margin (delta H(c,n)) are determined. The computation proceeds to step 521 where new handover margin settings are calculated from the delta H(c,n)'s, and the algorithm iterates. If the new handover margins are within the maximum and minimum power budgets allowable, the logic flow continues to step 509 where it is determined if remote units utilize neighbors having better signal strengths among those that are less loaded (see Eq. 2). If it is determined that remote units are not utilizing neighbors having better signal strengths, then the logic flow continues to step 519, otherwise the logic flow continues to step 511. At step 511 it is determined if the handover margins satisfy each cell's offered load constraint, (see Eq. 5) and if not the logic flow returns to step 505. If at step 511 it is determined that each base stations offered load constraint is satisfied, the logic flow continues to step 513 where it is determined if the traffic constraints are satisfied. (see Eq. 3 and Eq. 4). If the traffic constraints are not satisfied at step 511, the logic flow continues to step 519, otherwise the logic flow continues to step 515 where it is determined if the handover margins satisfy minimum margins to prevent ping-pong between mutual neighbors handover margins. (see Eq. 6). If at step 515 the minimum guard margins are not satisfied, then the logic flow continues to step 519, otherwise the logic flow ends at step 517 where the optimal handover margins are output to communication system 100. By allowing remote units to be served by base stations with lower received signals (but still within an acceptable quality level), localized congestion can be avoided and a higher call carrying capacity can be achieved within communication system 100.

Figure 6:
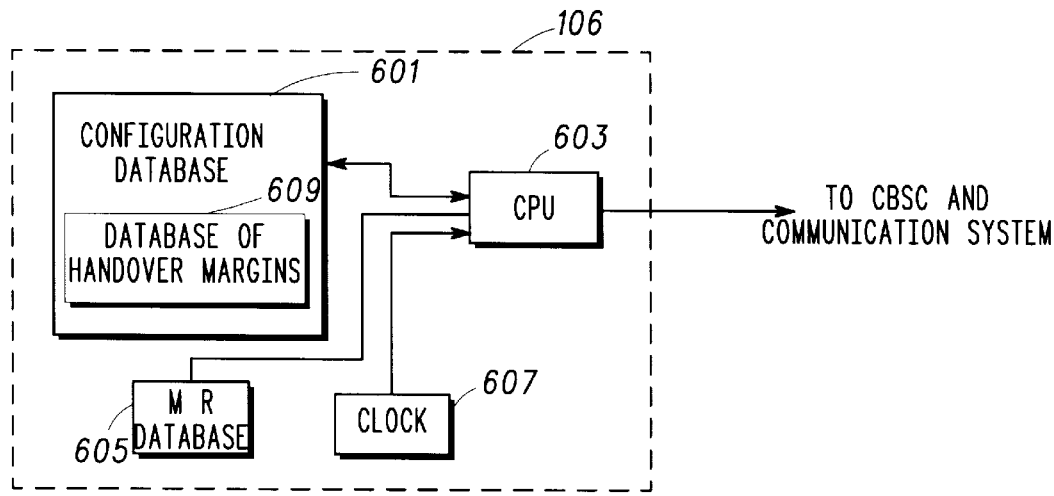
FIG. 6 is a block diagram of the optimization tool of FIG. 1 in accordance with a preferred embodiment of the present invention.

FIG. 6 is a block diagram of optimization tool 106 of FIG. 1 in accordance with a preferred embodiment of the present invention. Optimization tool 106 comprises configuration database 601, Central Processing Unit (CPU) 603, clock 607, database of handover margins 609 existing within configuration database 601, and measurement report (MR) database 605. In the preferred embodiment of the present invention, MR database 605 contains the measurement reports received in the base stations within communication system 100 during a collection time period.

Figure 7:
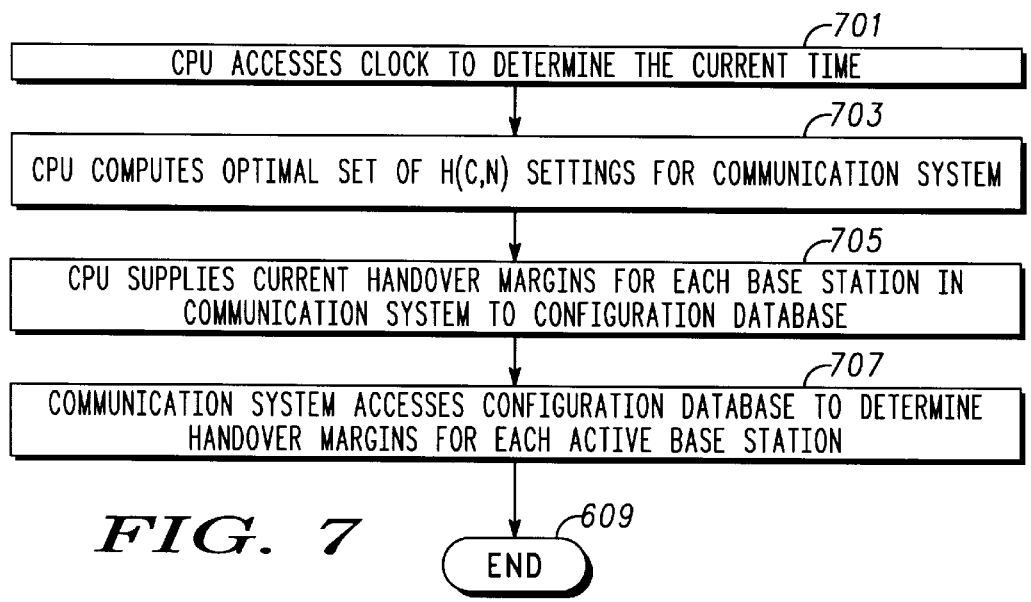
FIG. 7 is a flow chart illustrating operation of the optimization tool of FIG. 1.

Operation of optimization tool 106 in accordance with a preferred embodiment of the present invention occurs as illustrated in FIG. 7. The logic flow begins at step 701 where CPU 603 accesses clock 607 to determine the current time and the period during which the measurement report database was collected. Next, at step 703, CPU 603 accesses MR database 605 to compute optimal sets of handover margins (H(c,n)) for communication system 100. In the preferred embodiment of the present invention handover margin settings for each base station within communication system 100 are based on the time period and stored in database 609 as a function of time. Next, at step 705 CPU 603 supplies handover margins for the determined time period for each base station in communication system 100 to configuration database 601. In the preferred embodiment of the present invention, communication system 100 accesses configuration database 601 to determine handover margins for each active base station (step 707), and the logic flow ends at step 709. By allowing remote units to be served by base stations with lower received signals (but still within an acceptable quality level), localized congestion can be avoided and a higher call carrying capacity can be achieved by communication system 100.

Figure 8:
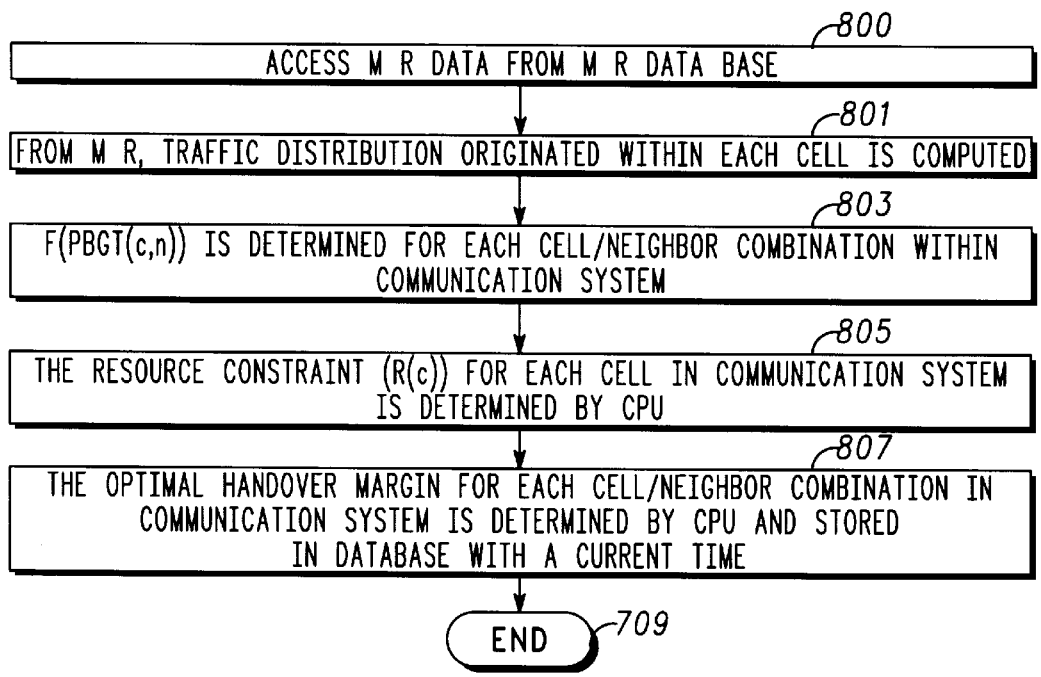
FIG. 8 illustrates a flow chart for those steps needed to create a database as shown in FIG. 6.

FIG. 8 illustrates a flow chart for those steps needed to create database 609 of FIG. 8. At step 800, CPU 603 accesses MR database 605 to determine measurement reports received in the base stations within communication system 100 during a collection time period. Next, at step 801 the traffic distribution T(c) originated within each base station is computed from measurement reports stored in database 605, and performance statistics of base stations within communication system 100 during the corresponding time period. Next, at step 803 F(PBGT(c,n)) is determined for each base station/neighbor combination within communication system 100, and at step 805 the resource constraint (R(c)) for each base station in communication system 100 is determined by CPU 603 from accessing configuration database 601. Next, at step 807 the optimal handover margin for each base station/neighbor combination in communication system 100 is determined by CPU 603 and stored in handover margin database 609 with a time period and the logic flow ends at step 809.

While the invention has been particularly shown and described with reference to a particular embodiment, it will be understood by those skilled in the art that various changes in form and details may be made therein without departing from the spirit and scope of the invention.

What is claimed is:

1. A method for determining a handover margin (H) in a communication system, the method comprising the steps of:
   measuring a signal quality of a serving base station and a neighbor base station to produce a comparison in signal quality between the serving and the neighbor base station;
   determining a percentage of traffic absorbed by the neighbor base station for a given handover margin based on the comparison in signal quality between the serving and the neighbor base station; and
   adjusting the handover margin between the serving base station and the neighbor base station based on the step of determining, wherein a handoff occurs from the serving base station to the neighbor base station when $PL(c)-PL(n) \geq H$, where $PL(n)$ is a pathloss from a remote unit to the neighbor base station and $PL(c)$ is a pathloss from the remote unit to the serving base station.

2. The method of claim 1 wherein the step of measuring the signal quality of the serving base station comprises the steps of:
   measuring by a remote unit, a downlink power level of the serving base station;
   measuring by the remote unit a downlink power level of the neighbor base station; and
   reporting the measurements to the serving base station.

3. The method of claim 1 wherein the step of determining the percentage of traffic absorbed by the neighbor base station for the given handover margin comprises the step of determining a distribution function (F) of a power budget measurement, wherein a percentage of remote units that will be absorbed from the serving base station to the neighbor base station is 1-F(H).

4. The method of claim 1 wherein the step of adjusting the handover margin between the serving base station and the neighbor base station comprises the step of operating the communication system at a predetermined capacity while maintaining a predetermined call quality.

5. The method of claim 4 wherein maintaining the predetermined call quality comprises the steps of:
   determining if the neighbor base station can adequately serve a remote unit; and
   ensuring that the remote unit is handed over to base stations that are close to a location of the remote unit.

6. A method for determining a handover margin (H) in a cellular communication system, the method comprising the steps of:
   measuring by a remote unit, a downlink power level of a serving base station;
   measuring by the remote unit a downlink power level of a neighbor base station;
   determining a percentage of traffic absorbed by the neighbor base station for a given handover margin based on the downlink power measurements; and
   adjusting the handover margin between the serving base station and the neighbor base station to maximize a communication system capacity, based on the step of determining, wherein a handoff occurs from the serving base station to the neighbor base station when $PL(c)-PL(n) \geq H$, where $PL(n)$ is a pathloss from the remote unit to the neighbor base station and $PL(c)$ is a pathloss from the remote unit to the serving base station.

7. The method of claim 6 wherein the step of determining the percentage of traffic absorbed by the neighbor base station for the given handover margin comprises the step of determining a distribution function (F) of a power budget measurement, wherein a percentage of remote units that will be absorbed from the serving base station to the neighbor base station is 1-F(H).

8. The method of claim 6 wherein the step of adjusting the handover margin between the serving base station and the neighbor base station comprises the step of operating the communication system at a predetermined capacity while maintaining a predetermined call quality.

9. The method of claim 8 wherein maintaining the predetermined call quality comprises the steps of:
   determining if the neighbor base station can adequately serve the remote unit; and
   ensuring that the remote unit is handed over to base stations that are close to a location of the remote unit.

10. A method for adjusting a handover margin (H(c,n)) between a serving base station (c) and a neighbor base station (n), the method comprising the steps of:
    determining a power budget (PBGT(c,n)) of the serving base station where $PBGT(c,n) \cong PL(c)-PL(n)$, $PL(n)$ is a pathloss from a remote unit to the neighbor base station (n), and $PL(c)$ is the pathloss from the remote unit to the serving base station (c);
    determining a distribution function (F) of PBGT(c,n), wherein a percentage of remote units that will be absorbed from the serving base station to the neighbor base station is 1-F(H(c,n));
    determining, based on the distribution function, if the remote unit will handover to the neighbor base station when the handover margin is set to a certain value, wherein the remote unit will handover to the neighbor base station when PBGT(c,n) is approximately equal to H(c,n); and
    adjusting H(c,n) based on the handover determination.

11. The method of claim 10 wherein the step of adjusting H(c,n) comprises the step of maximizing capacity of a communication system while maintaining a predetermined call quality.

12. The method of claim 11 wherein maintaining the predetermined call quality comprises the steps of:
    determining if the neighbor base station can adequately serve the remote unit; and
    ensuring that the remote unit is handed over to base stations that are close to a location of the remote unit.

13. The method of claim 10 wherein the step of adjusting H(c,n) comprises the steps of:

$$\text{maximizing}\left\{\sum_{\text{overall cells}(c)}\left[S(c)+\sum_{\text{over all neighbors }(n)\text{ for cell }(c)}G(c,n)\right]\right\}, \text{ where}$$

S(c) is a percentage of traffic that will be retained by base station c with the optimized settings of H(c,n), G(c,n) is a percentage of traffic that base station c gives up to the neighbor base station n when the handover margin is set to H(c,n), and H(c,n) is the handover margin setting from base station c to neighbor base station n.

14. A method comprising the steps of:
    measuring downlink power levels of a serving base station and a neighbor base station to produce a power budget measurement; and
    determining a percentage of traffic absorbed by the neighbor base station for a given handover margin based on the power budget measurement, wherein a handoff occurs from the serving base station to the neighbor base station when the power budget measurement is greater than the given handover margin, and the power budget is equal to PL(c)−PL(n) where PL(n) is a pathloss from a remote unit to the neighbor base station and PL(c) is a pathloss from the remote unit to the serving base station.

15. The method of claim 14 further comprising the step of adjusting the handover margin between the serving base station and the neighbor base station based on the step of determining.

16. The method of claim 14 wherein the step of measuring downlink power levels of a serving base station comprises the steps of:

measuring by a remote unit, the downlink power level of the serving base station;

measuring by the remote unit the downlink power level of the neighbor base station; and reporting the measurements to the serving base station.

17. An apparatus for adjusting a handover margin in a cellular communication system, the apparatus comprising:

means for determining a power budget (PBGT(c,n)) of the serving base station where PBGT(cn)≅PL(c)−PL(n), PL(n) is a pathloss from a remote unit to the neighbor base station (n) and PL(c) is the pathloss from the remote unit to the serving base station (c);

means for determining a distribution function (F) of PBGT(c,n), wherein a percentage of remote units that will be absorbed from the serving base station to the neighbor base station is 1-F(H(c,n));

means for determining, based on the distribution function, if the remote unit will handover to the neighbor base station when the handover margin is set to a certain value, wherein the remote unit will handover to the neighbor base station when PBGT(c,n) is approximately equal to H(c,n); and means for adjusting H(c,n) based on the handover determination.

* * * * *